United States Patent [19]

Braun et al.

[11] Patent Number: 5,054,607

[45] Date of Patent: Oct. 8, 1991

[54] DRIVE STATION FOR A LONGWALL CONVEYOR

[75] Inventors: Gert Braun; Ernst Braun, both of Essen-Heisingen, Fed. Rep. of Germany

[73] Assignee: Halbach & Braun Industrieanlagen, Fed. Rep. of Germany

[21] Appl. No.: 13,736

[22] Filed: Feb. 12, 1987

[30] Foreign Application Priority Data

Feb. 13, 1986 [DE] Fed. Rep. of Germany ....... 3604488

[51] Int. Cl.$^5$ ............................................. B65G 23/44
[52] U.S. Cl. .................................... 198/813; 198/834
[58] Field of Search ............... 198/733, 813, 814, 834; 299/43, 64

[56] References Cited

U.S. PATENT DOCUMENTS

| | | | |
|---|---|---|---|
| 3,718,197 | 2/1973 | Barten et al. | 198/814 X |
| 3,773,166 | 11/1973 | Nowacki | 198/814 X |
| 3,790,210 | 2/1974 | Georg | 299/43 |
| 4,037,876 | 7/1977 | Georg et al. | 299/43 |
| 4,090,601 | 5/1978 | Freed, Jr. | 198/813 X |
| 4,093,065 | 6/1978 | Temme | 198/834 X |
| 4,159,851 | 7/1979 | Rösler | 299/43 |
| 4,190,295 | 2/1980 | Boast | 299/43 |
| 4,657,131 | 4/1987 | Bruchta et al. | 198/813 X |

Primary Examiner—Robert J. Spar
Assistant Examiner—D. Glenn Dayoan
Attorney, Agent, or Firm—McGlew & Tuttle

[57] ABSTRACT

A drive station for a longwall conveyor includes a sprocket wheel mounted in the drive head of a machine frame and with a drive unit flanged to the sprocket wheel. The lateral walls of the machine frame are formed in the region of its drive head as guide cheeks with guide recesses for bearing cheeks displaceably guided therein in longitudinal haul direction, between which (cheeks) the sprocket wheel is mounted. The bearing cheeks are connected together by a traverse. A chain tensioning device works against the traverse. For the drive chain of a winning machine a second drive unit is provided, which is likewise mounted displaceably in longitudinal haul direction and is acted upon by a chain tensioning device. In this manner the conveyor chain and the drive chain e.g. plane chain, can be tensioned independently of each other while obtaining a short machine frame design.

6 Claims, 2 Drawing Sheets

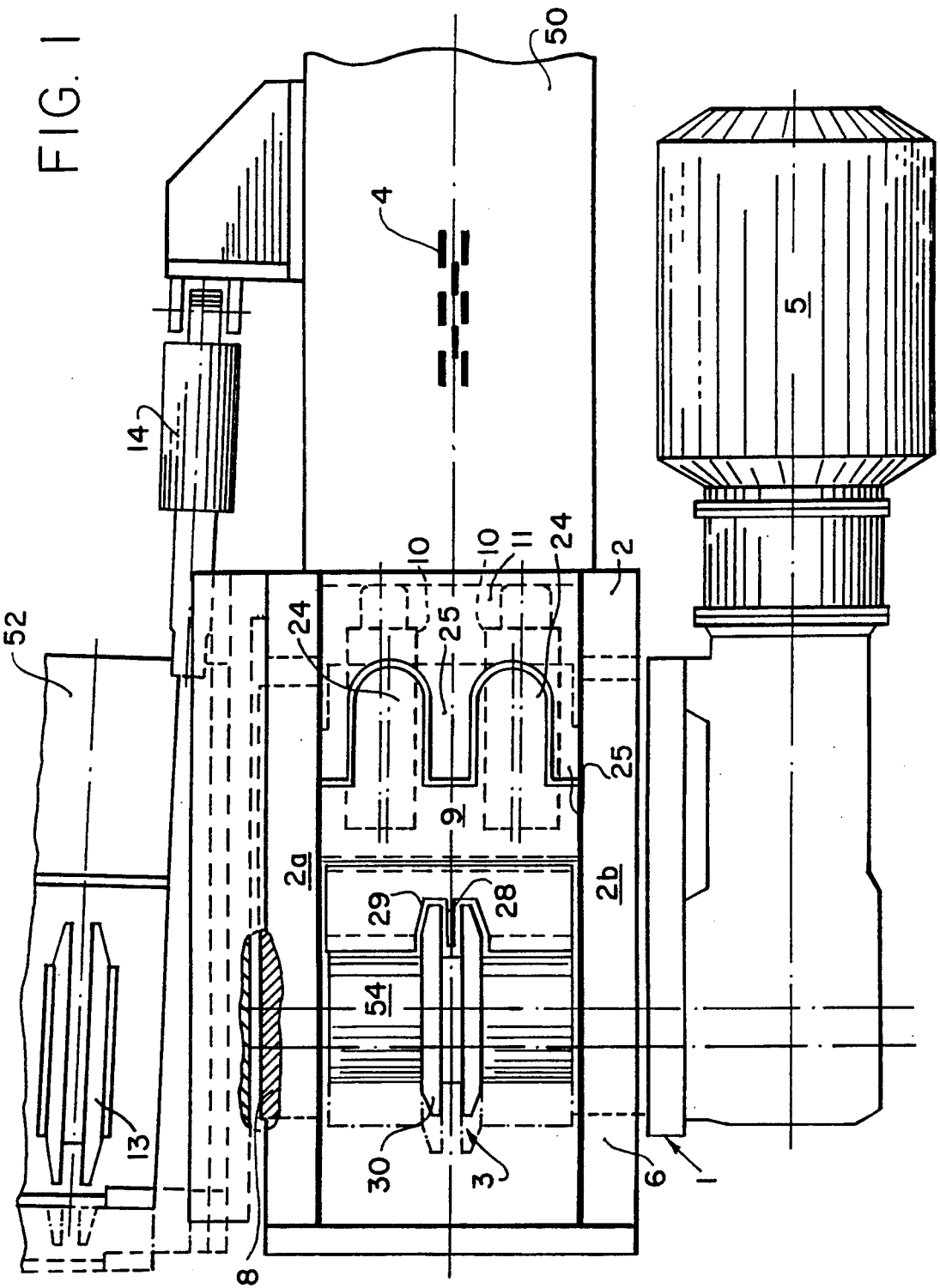

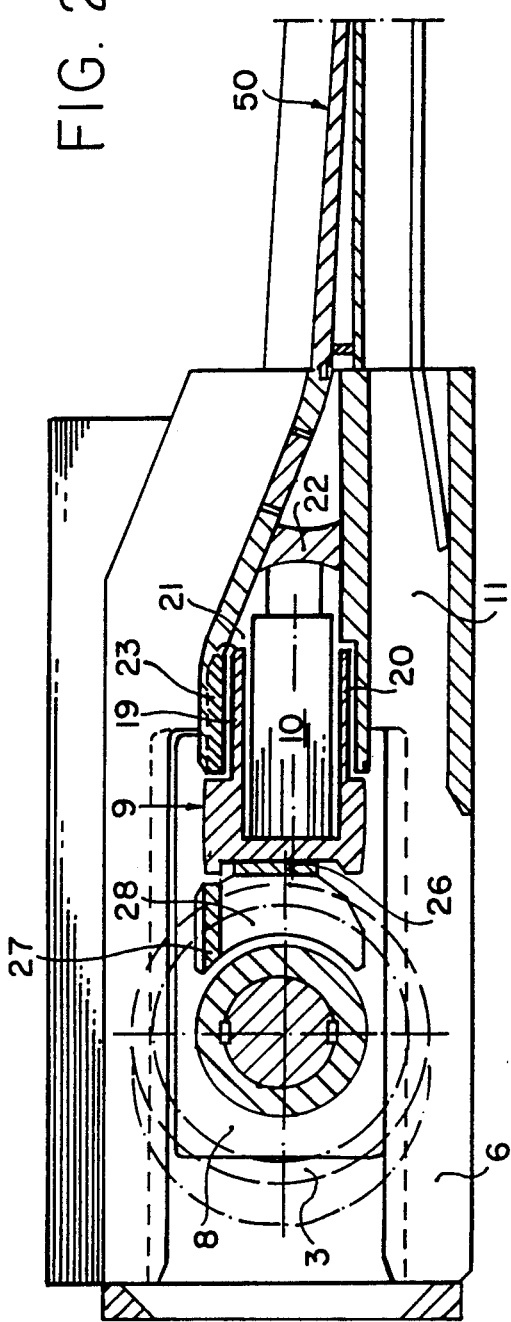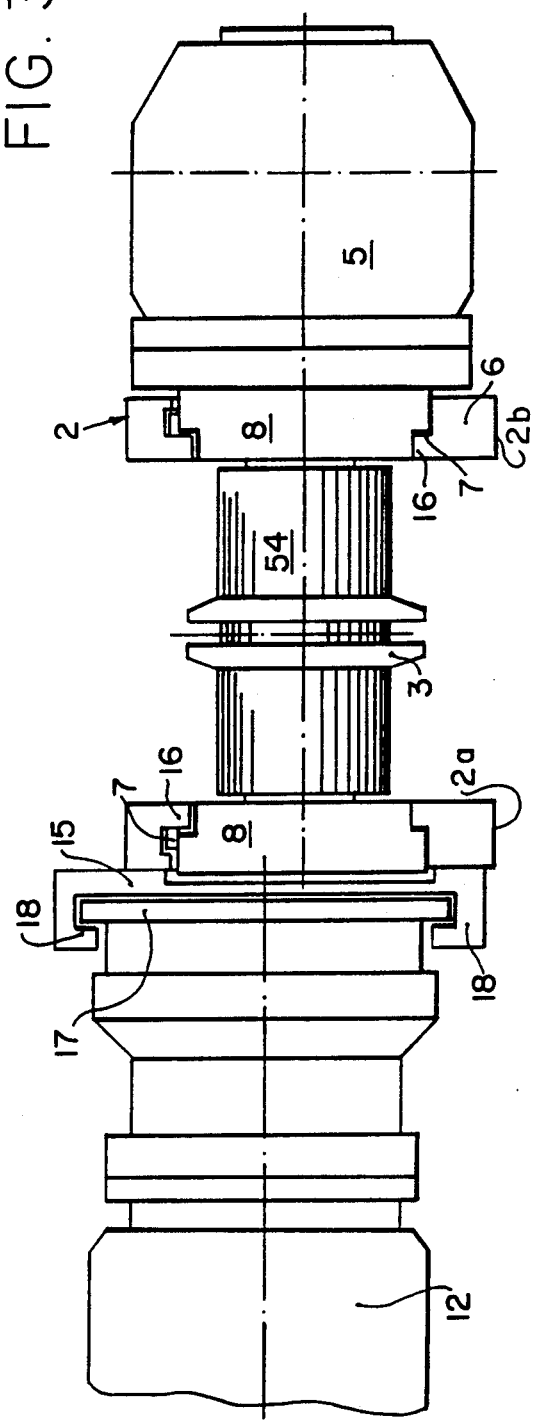

DRIVE STATION FOR A LONGWALL CONVEYOR

FIELD AND BACKGROUND OF THE INVENTION

This invention relates in general to mining equipment and in particular to a new and useful drive station for a longwall conveyor.

The invention relates particularly to a drive station for a chain conveyor such as a longwall conveyor, having a sprocket wheel mounted at the drive end of the chain conveyor in the drive head of a machine frame and having a drive unit flanged on the side of the sprocket wheel on the outside of the machine frame.

In chain conveyors and in particular longwall conveyors with a winning machine such as a coal plane, cutting machine, or the like, guided at the coal face, a constant problem is the tensioning of the conveyor chain and the plane chain. To overcome this, a machine frame has become known which is designed as a frame telescoping in a longidinal haul direction. Such a telescoping machine frame, which is normally connected to the actual conveyor trough with the interposition of a connecting trough, has several disadvantages. In the first place, the machine frame is equipped, as are the connecting trough and conveyor trough, with guide elements for the winning machine. Such guide elements as plane guiding segments or cutter guiding segments can in practice not be carried out as telescoping elements. But this is necessary if the winning machine is to be guided up to the drive head of the machine frame to avoid dead space. Consequently, in the case of a telescoping machine frame, guiding of the winning machine up to the head end of the chain conveyor must be given up and a dead space accepted. Moreover, separate tensioning of the conveyor chain and plane chain is not possible, because due to the telescoping machine frame, tensioning of the conveyor chain necessarily entails tensioning of the plane chain as well. The two chains, however, require a different chain tension, so that separate retensioning or relaxing of the plane chain is always necessary. This is not only expensive but also required relatively long tensioning distances, hence a long machine frame. This is what the invention intends to remedy.

SUMMARY OF THE INVENTION

The invention provides a drive station for a chain conveyor, more particularly a longwall conveyor, of the initially described kind which permits the separate tensioning of the conveyor chain and of the plane chain with different chain tensions while achieving a short machine frame with the winning machine being guided into the head region.

According to the invention, a drive station includes lateral walls of the machine frame which are formed in the region of its drive head as guide cheeks with guide recesses for bearing cheeks displaceably guided therein in a longitudinal haul direction, and the sprocket wheel is mounted in or between the bearing cheeks. The bearing cheeks are connected together by a traverse with formation of a U-shaped mount for the sprocket wheel. A chain tensioning device which is supported on the rump of the machine frame acts against the traverse. These measures of the invention have the result that the chain of the chain conveyor can be tensioned independently of the plane chain or cutting chain or similar drive chain. Conversely this applies equally to the plane chain relative to the conveyor chain. Consequently, retensioning or subsequent relaxing of one or the other chain is unnecessary. Moreover, a machine frame as a rigid frame can be kept, with a winning machine advancing into the region of the drive head or with guide segments for the winning machine connected to the machine frame up to that point. Moreover, the design of the machine frame may be short because the tensioning distances resulting from the mutually independent tensioning systems for conveyor chain and plane chain can be relatively short. It is of importance that the drive station is designed with a second drive unit and the sprocket wheel for the winning machine is guided at the chain conveyor and with a separate chain tensioning device for this drive unit, or its sprocket wheel. The drive unit, for the winning machine, is displaceably guided at a guide plate on the outside of the machine frame opposite the drive unit for the chain conveyor, in a longitudinal haul direction. Both drive units or their sprocket wheels can, therefore, be displaced independently of each other in a longitudinal haul direction until the respective required chain tension is reached. In both cases the drive units comprise a motor, transmission and clutch. Thus the guide cheeks may embrace the bearing cheeks on the top and bottom internally with L-or U-shaped guide strips, so that a sliding conduction for the bearing cheeks is realized.

In similar manner the drive unit for the winning machine may comprise a slide plate which slides in U-shaped guide sections on the top and bottom of the guide plate. According to a preferred embodiment of the invention, the traverse is designed as a U-section, the upper and lower legs of which are guided in a mouth type mount of the rump of the machine frame and receive between them one or more cylinder-piston arrangements as chain tensioning devices which are braced against an abutment in the mount. Thereby a compact construction is achieved. The bearing cheeks and the traverse thus form in practice a displaceable insert between the lateral walls of the machine frame. Preferably the upper U-leg of the traverse and the upper leg of the mount have fingers interengaging with play as deflectors for the conveyor chain and the drivers connected thereto. The invention further provides that on the front, at the vertical base bar of the traverse, a deflector for conveyor chain and drivers is fastened in the transition region between traverse and sprocket wheel. The deflector partially spans the sprocket wheel over the length thereof by a bridging section and it has a recess for the chain drum. The bridging section has a vertical nose section which engages in the chain drum on the sprocket wheel.

The advantages achieved by the invention are to be seen essentially in that a drive station for a chain conveyor, more particularly a longwall conveyor with a winning machine guided on the coal face side, is realized, which is equipped with two mutually independent tensioning systems for the conveyor chain and the plane chain, or similar drive chain. Thus, combined with relatively short tensioning distances, the machine frame can be made short and moreover, the winning machine can, as before, be moved forward into the region of the drive head. For only in the region of the drive head do the forward movements of the drive units, required for the tensioning of the chains, take place.

Accordingly it is an object of the invention to provide a drive station for a longwall conveyor which comprises a first machine frame having spaced apart side walls each with a bearing recess which receives a bearing block which may be movable therein and wherein the bearing blocks provide a rotatable support for a chain drive shaft and including a chain tensioning device carried by the frame and which is connected to the shaft for shifting the shaft with respect to the frame for tensioning the chain of a scraper conveyor.

A further object of the invention is to provide a drive station for a longwall conveyor which includes means for tensioning one or more chains such as a chain conveyor in a conveyor associated with a winning machine.

A further object of the invention is to provide a drive station which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic top view of a drive station of a chain conveyor constructed according to the invention;

FIG. 2 is a vertical section taken along the line 2—2 of FIG. 1; and

FIG. 3 is a front elevational view of the device shown in FIG. 1.

DESCRIPTION OF THE PREFERRED EMBODIMENTS

Referring to the drawings in particular, the invention embodied therein comprises a drive station which includes a drive head 1 for driving a conveyor chain 4 of a longwall conveyor 50 and which also includes a drive for a sprocket 13 of a coal plane or cutting machine 52 which defines a second frame or support.

In accordance with a first feature of the invention, as indicated in the drawings, there is a first machine frame 2 having spaced apart side walls 2a and 2b with a guide recess 7 for accommodating laterally spaced bearing blocks or cheeks 6 and 8 for rotatably mounting a shaft 54 having a sprocket wheel 3 affixed there for rotation therewith for the purpose of driving a long conveyor chain 4. In accordance with the invention a chain tensioning device generally designated 10 comprises a piston and cylinder combination arranged between a traverse 9 connected to the bearing blocks 6 and 88 and a support or bracket 22 of the frame 2. Fluid pressure may be admitted to the cylinder of the tensioning device 10 which is effective to shift the bearing blocks together with the shaft for the sprocket 3 forming a chain drive 30 for the chain 4 of the longwall conveyor 50.

In the figures is shown a drive station for a chain conveyor, more particularly a longwall conveyor, with a sprocket wheel 3, mounted in the drive head 1 of a machine frame 2 of a drive end of the chain conveyor, for one or more chains 4 of the chain conveyor and with a drive unit 5 with clutch, transmission and motor sprocket wheel 3. The lateral walls of the machine frame 2 are designed, in the region of its drive head 1, as the guide cheeks 6 and with guide recesses 7 for bearing cheeks displaceably guided therein in longitudinal haul direction. The sprocket wheel 3 is mounted in or between these bearing cheeks 8. The bearing cheeks 8 are connected together by a traverse 9 which forms a U-shaped mount for the sprocket wheel 3. Acting against the traverse 9 is a chain tensioning device 10, which is supported at the rear or rump 11 of the machine frame 2, that is, at the end of the machine frame 2 associated with a connecting trough 50.

According to the embodiment example, the drive station is equipped with a second drive unit 12 and sprocket wheel 13 affixed to a second drive shaft 13a for a winning machine guided at a chain conveyor, e.g. a coal plane or cutting machine 52, and with a chain tensioning device 14 for tensioning the second drive unit 12 or respectively its sprocket wheel 13. For this purpose, a cylinder of the tensioning device 14 is pivoted at its one end to a fixed support and is connected at its opposite by a piston rod to the cutting machine 52. The second drive unit 12 is guided displaceably at a guide plate 15 on the outside of the machine frame 2 opposite the drive unit 5 for the chain conveyor, in longitudinal haul direction, namely likewise in the region of the drive head 1 of the machine frame 2. Also in this case the drive unit 12 comprises a clutch, transmission and motor.

In the chain tensioning device 10 for the conveyor shaft 4, the guide cheeks 6 embrace the bearing cheeks 8 on the top and bottom internally by L- or U-shaped guide strips 16. The drive unit 12 for the winning machine driven by motor 12 and sprocket 13 has a slide plate 17 which slides in U-shaped guide sections 18 on the top and bottom of the guide plate 15.

The traverse 9 is formed as a U-section whose upper and lower legs 19 and 20 are guided in a mouth type mount 21 of the rump 11 of the machine frame 2 and receive between them one or more cylinder-piston arrangements 10 as a chain tensioning device, which are braced against an abutment 22 in the mount 21. The upper U-legs 19 of the traverse 9 and the upper leg 23 of mount 21 have fingers 24, 25 interengaging with play, as deflectors for the conveyor chain 4, and drivers (not shown) which are connected thereto. Further, on the front of the vertical base bar 26 of traverse 9 a deflector 27 and 28 for the conveyor chain 4 and associated drivers is fastened in the transition region between transverse 9 and sprocket wheel 3, which deflector partially spans the sprocket wheel 3 by a bridging section 27 and has a recess 29 for the chain drum 30, and which further engages by a vertical nose section 28 into the chain drum 30 on the sprocket wheel 3. A tensioning or displacement movement of the drive units 5, 12 for conveyor chain and plane chain is indicated by dashed lines.

While specific embodiments of the invention have been shown and described in detail to illustrate the application of the principles of the invention, it will be understood that the invention may be embodied otherwise without departing from such principles.

What is claimed is:

1. A drive station for a chain of a longwall conveyor having a winning machine, comprising first machine frame having spaced apart side walls each with a bearing recess, a first rotatable chain drive shaft rotatably supported by said frame, bearing block means rotatably supporting said drive shaft and being movably engaged in respective ones of said bearing recess of said side walls, a chain drive sprocket carried by said shaft for rotating therewith, a tensioning device carried by said first frame engageable with said shaft for shifting said first shaft with said sprocket for tensioning said chain thereon, a second drive unit for said winning machine including a second chain drive sprocket shaft, a second chain drive sprocket affixed to said second drive sprocket shaft, said second drive sprocket shaft having a rotation axis, a second frame supporting said second chain drive sprocket shaft adjacent said first frame and being movable in directions perpendicular to said second chain drive sprocket shaft rotation axis, and a second tensioning device connected to said second frame moving said second frame for tensioning said second chain drive sprocket.

2. A drive station according to claim 1, including a traverse member connected between said bearing block means and said tensioning device, said bearing blocks being displaceably guided in said bearing recesses of said side walls, said tensioning device comprising a fluid pressure operated piston and cylinder combination.

3. A drive station according to claim 1, including a motor having a drive motor drive shaft connected to said first drive shaft for rotating said first drive shaft and means supporting said drive motor with said drive motor shaft on said frame.

4. A drive station for a chain of a longwall conveyor having a winning machine comprising first machine frame having spaced apart side walls each having a bearing recess, a first rotatable chain drive shaft, bearing block means rotatably supporting said first rotatable drive shaft, said bearing block means being engaged with each end of said first rotatable chain drive shaft and being displaceable in respective bearing recesses, a chain drive sprocket engageable with the chain and carried by said first drive shaft for rotation therewith for moving the chain, chain tensioning device carried by said frame and engageable with said first drive shaft for shifting said first drive shaft in a longitudinal direction in respect to the chain travel for tensioning said chain, a substantially U-shaped traverse member having respective ends engaged with respective bearing blocks being connected between said chain tensioning device and said shaft, said traverse being a substantially U-sectioned member having upper and lower leg portions, a mouth-like mount arranged in said frame and guiding said traverse, said tensioning device comprising at least one fluid operated piston and cylinder combination connected between said frame and said traverse member, a second drive unit for said winning machine including a second chain drive sprocket shaft having a rotation axis, a support supporting said second chain drive sprocket shaft adjacent said frame and being movable in directions perpendicular to said rotation axis, and a second tensioning device connected to said support for moving said support for adjusting the tension on said second chain drive sprocket.

5. A drive station according to claim 4, wherein said upper leg portion of said traverse and an upper portion portion of said mount have fingers which interenage with play therebetween and provide a support for said conveyor chain.

6. A drive station according to claim 4, wherein said traverse has a vertical base bar connected between said upper and lower leg portions and including a deflector for said conveyor chain and driver attached to the transition region between said traverse and said chain drive sprocket, said deflector partially spanning said chain drive sprocket and including a bridging section, said chain drive sprocket having a drum-like configuration with a central recess, said deflector having a nose engageable to said recess.

* * * * *